United States Patent [19]
Kim et al.

[11] Patent Number: 6,141,197
[45] Date of Patent: Oct. 31, 2000

[54] SMART RESIDENTIAL CIRCUIT BREAKER

[75] Inventors: Edward E. Kim, Burlington, Conn.;
John J. Dougherty, Collegeville, Pa.;
Esteban Santos, Farmington, Conn.;
David Arnold, Chester, Conn.; Richard E. Saunders, Granby, Conn.; Ronald D. Ciarcia, Bristol, Conn.; James I. Smith, Avon, Conn.; Richard A. Menelly, Burlington, Conn.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/037,689

[22] Filed: Mar. 10, 1998

[51] Int. Cl.[7] .................................................. H02H 3/00
[52] U.S. Cl. .............................. 361/93; 361/42; 361/97; 361/102; 361/93.3; 361/93.5; 361/93.6
[58] Field of Search ...................... 361/42–50, 93–102, 361/115, 78–79, 86–87; 335/18, 215

[56] References Cited

U.S. PATENT DOCUMENTS

| | | | |
|---|---|---|---|
| 3,621,334 | 11/1971 | Burns et al. | 361/45 |
| 4,266,259 | 5/1981 | Howell | 361/97 |
| 4,345,289 | 8/1982 | Howell | 361/45 |
| 4,368,394 | 1/1983 | Naimer | 307/115 |
| 4,425,596 | 1/1984 | Satou | 361/93 |
| 4,513,268 | 4/1985 | Seymour et al. | 335/35 |
| 4,532,571 | 7/1985 | Satou | 361/93 |
| 4,591,942 | 5/1986 | Willard et al. | 361/97 |
| 4,646,198 | 2/1987 | Rich et al. | 361/346 |
| 4,649,455 | 3/1987 | Scott | 361/93 |
| 4,667,263 | 5/1987 | Morris et al. | 361/42 |
| 4,667,269 | 5/1987 | Morby et al. | 361/355 |
| 4,672,501 | 6/1987 | Bilac et al. | 361/96 |
| 4,728,914 | 3/1988 | Morris et al. | 335/6 |
| 4,754,247 | 6/1988 | Raymont | 335/202 |
| 5,023,684 | 6/1991 | Tsunoda | 257/295 |
| 5,247,419 | 9/1993 | Grundmann | 361/94 |
| 5,583,732 | 12/1996 | Seymour et al. | 361/93 |
| 5,633,776 | 5/1997 | Juncu | 361/115 |

FOREIGN PATENT DOCUMENTS 9711475  3/1997  WIPO.

OTHER PUBLICATIONS

Ted Tingay, The Attractions of Giant Magnetoresistance Sensors, Electrotechnology, pp.33–35, Oct. 1996.
David Brunt Search Report under Section 17, Jun. 25 1999.

*Primary Examiner*—Michael J. Sherry
*Attorney, Agent, or Firm*—Cantor Colburn LLP; Damian G. Wasserbauer; Carl B. Horton

[57] ABSTRACT

A circuit interrupter of the type including an electronic trip unit for overcurrent determination includes a separate circuit to power the trip unit along with a Hall Effect or GMR Device to sense the current flow within the protected circuit. A removable option plug electrically interconnects with the trip unit to enable ground fault and arcing fault protection.

30 Claims, 3 Drawing Sheets

SMART RESIDENTIAL CIRCUIT BREAKER

BACKGROUND OF THE INVENTION

State-of-the-art circuit breakers and circuit interrupters such as described within U.S. Pat. No. 4,672,501 entitled "Circuit Breaker and Protective Relay Unit" employ digital circuitry to perform overcurrent protection along with supplementary protection function. The so-called "electronic trip units" within such circuit breakers have here-to-fore been limited to industrial applications in view of the added costs associated with the electronic trip unit components. To provide electronic input to the circuit interrupters from associated electrical equipment, transducers such as current transformers described in U.S. Pat. No. 4,591,942 entitled "Current Sensing Transformer Assembly", Hall effect devices, such as described in U.S. Pat. No. 5,615,075 entitled "AC/DC Current Sensor for a Circuit Breaker" and GMR (Giant MagnetoResistor) devices as described in U.S. patent appliation Ser. No. 09/006,794 entitled "Circuit Interrupter Having Improved Current Sensing Apparatus" are often required.

Typically, the current transformers usually provide two functions within the electronic trip unit circuit. The first function is to provide operating power to the electronics within the trip unit and the second function is to provide electronic signals representative of the magnitude of the current flowing within each phase of a multi-phase electrical distribution system. U.S. Pat. No. 5,583,732 entitled "Modular Current Transformer for Electronic Circuit Interrupters" describes a recent approach to combine the two functions within a single modular arrangement at a savings in both material costs and manufacturing assembly costs. A separate current transformer is required within each phase of a multi-phase electrical circuit.

When overcurrent protection is provided in residential applications, circuit breakers employing thermal magnetic trip units are installed within the residential load centers for protecting the main and branch circuits connecting with the load centers. U.S. Pat. No. 4,513,268 entitled "Automated Q-Line Circuit Breaker" describes one such residential circuit breaker including a thermal magnetic trip unit for overcurrent protection.

U.S. Pat. No. 4,667,269 entitled "Circuit Breaker Support Saddle Having A Split Neutral Connector" and U.S. Pat. No. 4,646,198 entitled "Molded Case Circuit Breaker Modular Support Assembly" disclose compartments arranged for housing a main circuit breaker along with a plurality of branch circuit breakers electrically connected in series with the main circuit breaker.

When such thermal magnetic circuit breakers are employed in such residential load centers, the use is limited to overcurrent circuit protection. Ground fault and arcing fault function must be added to the circuit breakers by means of ground fault and arcing fault modules that are attached to the circuit breaker enclosure at further cost increase. On such arcing fault module is described within U.S. patent appliation Ser. No. 09/006,796 entitled "Arcing Fault Detection Module".

Accordingly, attempts to incorporate a so-called "smart" circuit breaker having an electronic trip unit in a residential load center for providing additional protective features to the load center have not proven economically feasible to date. The need of a current transformer to provide both operating power and sensing function to the electronic trip unit increases both the size of the circuit breaker as well as the overall cost since the current transformers are usually contained within the circuit breaker enclosure, along with the circuit breaker operating mechanism, contacts and trip unit.

It would be beneficial to provide a separate circuit for providing operating power to the trip unit in combination with small-sized electronic transducers for determining the current magnitude in view of cost and size restraints with 2-pole circuit breakers used within residential load centers. A further benefit is the use of an option plug in the form of a removable electronic circuit to enable the trip unit to perform ground fault, arcing fault and their combination.

One purpose of the invention accordingly, is to describe an inexpensive smart circuit breaker having an electronic trip unit with an electronic transducer within each pole of a 2-pole circuit breaker and an equivalent circuit within at least one of the poles to supply operating power to the trip unit.

SUMMARY OF THE INVENTION

A circuit interrupter of the type including an electronic trip unit for overcurrent determination includes a separate circuit to power the trip unit along with a Hall Effect or GMR Device to sense the current flow within the protected circuit. A separate Hall or GMR device is used within each pole of a 2-pole electric circuit while one or more equivalent circuits can be effectively employed for providing operating power to the trip unit and Hall effect or GMR device. A removable option plug electrically interconnects with the trip unit to enable ground fault and arcing fault protection.

DESCRIPTION OF THE PREFERRED EMBODIMENT

Figure 1:
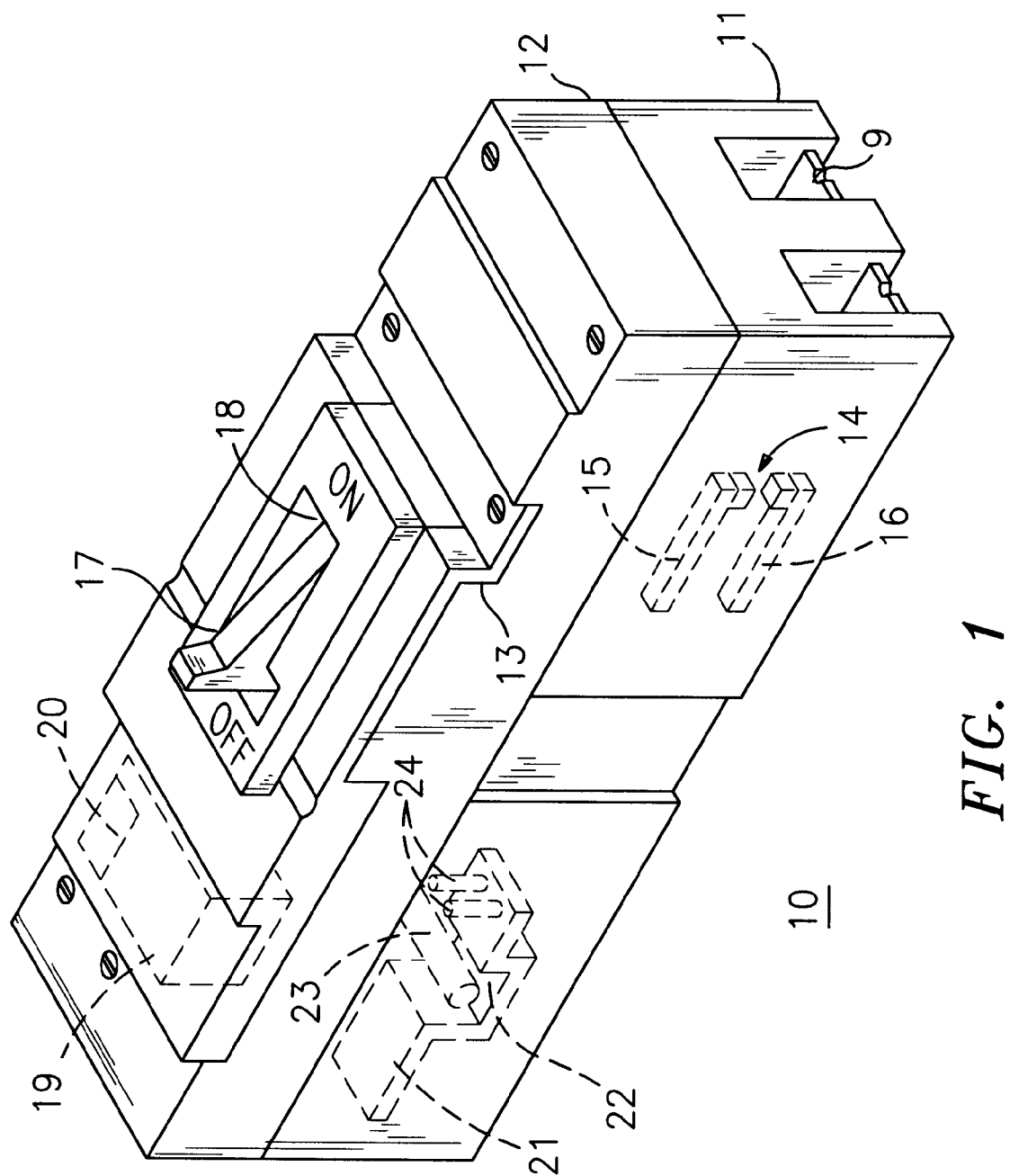
FIG. 1 is a front perspective view of a circuit breaker including the Hall Effect or GMR sensor in accordance with the invention.

An electronic circuit breaker 10 is shown in FIG. 1 to consist of a molded plastic case 11 to which a cover 12 of similar material is attached. The circuit breaker includes an intermediate cover 13 of the type described within U.S. Pat. No. 4,754,247 entitled "Molded Case Circuit Breaker Accessory Enclosure" for providing access to the electronic trip unit 19 contained thereunder. A pair of separable contacts 14 at the ends of a pair of contact carriers 15, 16 are turned to ON and OFF positions by means of an external operating handle 17 that extends through an aperture 18 in the circuit breaker cover. In accordance with the invention, an electronic optional function plug 20 having a configuration similar to that described in U.S. Pat. No. 4,649,455 entitled "Rating Plug for Molded Case Circuit Breakers" is inserted within the accessory cover to allow selection between arcing fault determination, ground fault determination, or both. Connection between the trip unit 19 and the optional function plug 20 is achieved in the manner described in U.S. Pat. No. 4,728,914 entitled "Rating Plug Enclosure for Molded Case Circuit Breakers", the ground fault detection circuit is described within U.S. Pat. No. 4,345,289 entitled "Ground Fault Circuit Interrupting Device with Improved Thyristor Triggering" and the arcing fault detection circuit is described within the aforementioned U.S. patent appliation Ser. No. 09/006,796. The line straps 9, arranged at one end of the case 11 provide connection within a protected electrical distribution circuit, while corresponding load straps 21 arranged at the opposite end thereof provide connection with the protected loads arranged within the circuit. A Hall or GMR device semiconductor 23 is positioned within a recess 22 on each load strap 21 for sensing the current transfer through the load strap and transferring signal representations thereof to the trip unit 19 over a pair of conductors 24. The Hall Device, hereinafter "Hall sensor" is a type GH-600-GH800 obtained from F. W. Bell and is similar to that described in U.S. patent application Ser. No. 09/006,795 entitled "Circuit Breaker with Ground Fault Detection Module" and is capable of providing electronic sensing as well as maintaining electrical isolation between the Hall sensors and the associated load straps.

Figure 2:
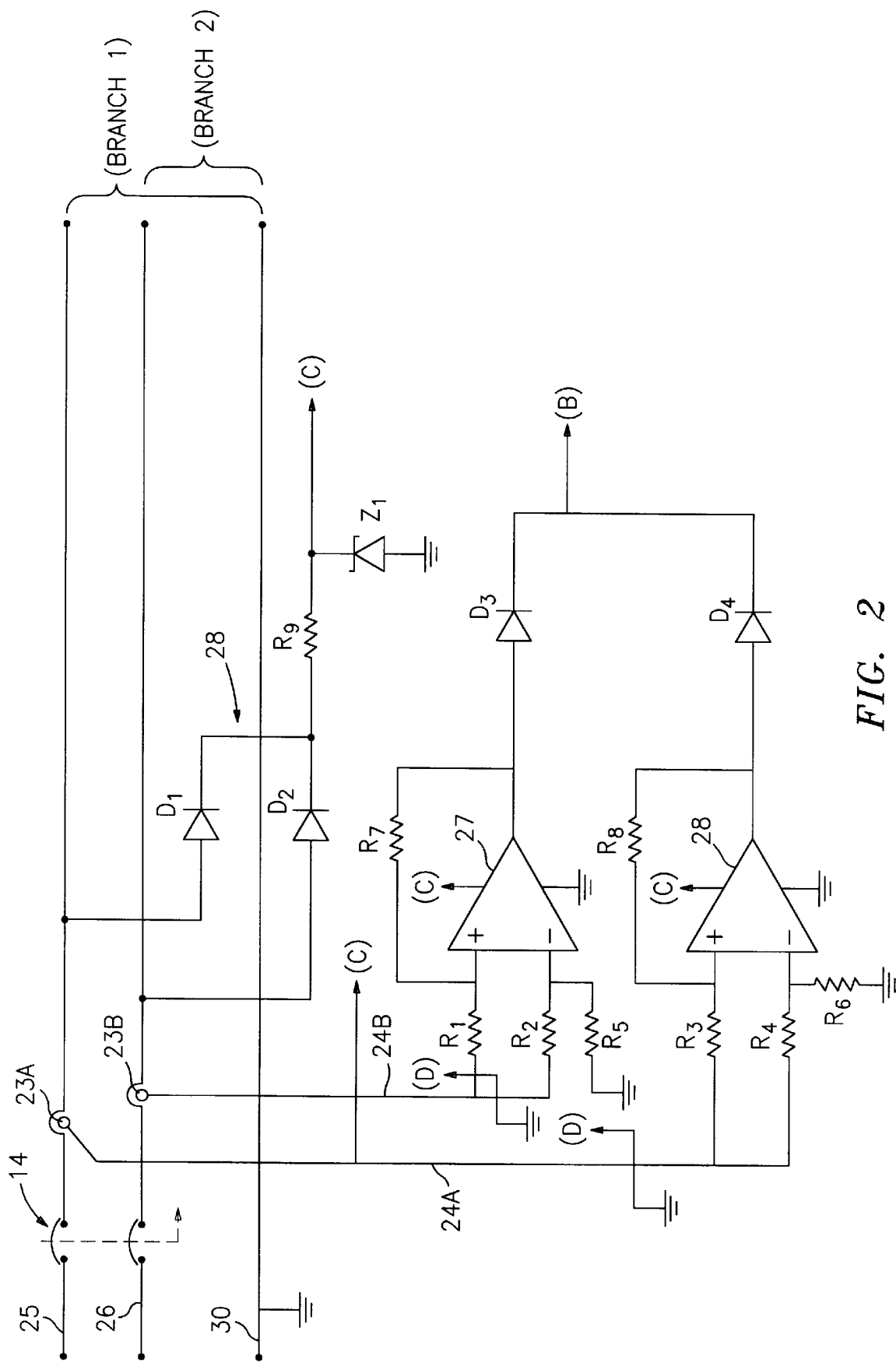
FIGS. 2 and 3 are diagrammatic representations of the electronic trip unit components within the circuit breaker of FIG. 1.
Figure 3:
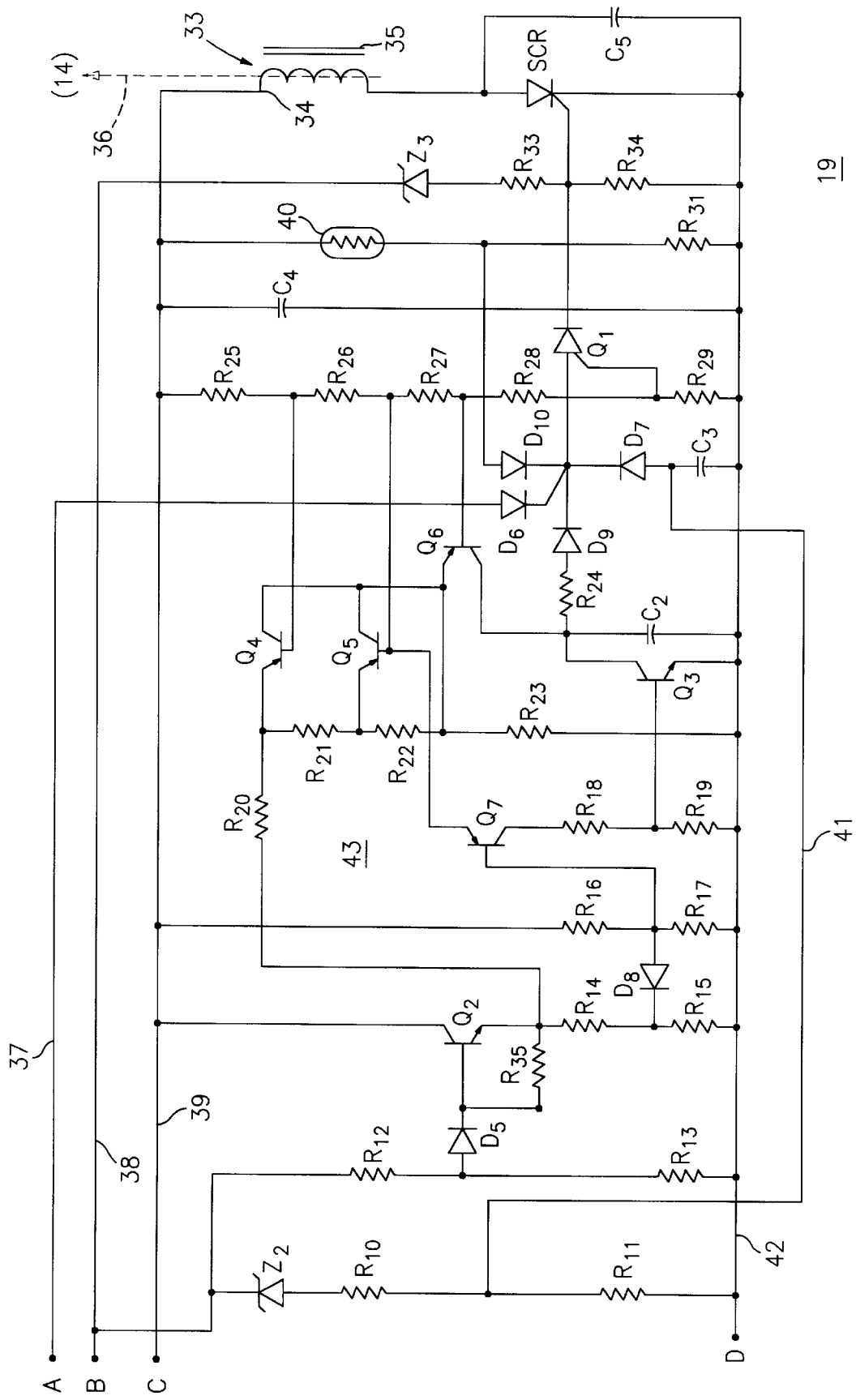

The electrical connections between the phase conductors 25, 26 and neutral conductor 30 within a residential circuit and the circuit breaker trip unit 19 are now shown in FIGS. 2 and 3. The circuit breaker contacts 14 are connected in series within the two phases represented by conductors 25, 26, the Hall sensors 23A,B as shown in FIG. 2, are positioned next to the phase conductors 25, 26 that comprise branch circuits 1 and 2 relative to the common neutral conductor 30. The operating power to the trip unit 19 electronic circuitry is provided by means of a power supply circuit 28 consisting of rectifying diodes $D_1$, $D_2$ per each phase through the current limiting resistor $R_9$ and voltage regulator Zener diode $Z_1$ to the trip unit power conductor 39 via terminal C. The operating power requirements of the Hall or GMR Sensors and the operational amplifiers are also met by connection with terminal C. The output of the Hall sensors 23A,B connect through conductor pairs 24A,24B and current limiting resistors $R_1$–$R_4$ to the inputs of operational amplifiers 27, 28 to amplify the sensed current values. The amplifiers connect with ground through ground resistors $R_5$, $R_6$ and interconnect between their inputs and outputs via feedback resistors $R_7$, $R_8$ as indicated. The current values are combined and rectified through diodes $D_3$, $D_4$ and are inputted to the trip unit signal conductor 38 within via connection with terminal B. Connection between the optional circuit neutral conductor 31 and the trip unit neutral conductor 42 is made via terminal D and connection between the optional circuit neutral conductor 31 and the circuit breaker optional signal input 37 is made via terminal A.

In operation, the trip solenoid 33 consisting of a coil 34, and core 35 interacts with the circuit breaker contacts 14 by means of the control connection indicated at 36. When the SCR is turned on, operating power is provided to the solenoid by connection with the power conductor 39 allowing the solenoid control connection to separate the contacts and interrupt circuit current on command. Upon occurrence of a short circuit current on the signal conductor 38, the high in-rush current turns on the reverse Zener diode $Z_3$ and allows current to flow from the junction of the voltage divider resistors $R_{33}$, $R_{34}$ to the gate of the SCR. The filter capacitor $C_5$ protects the SCR from spurious noise effects occurring on the on the power conductor 39. The operation of a trip solenoid to separate circuit breaker contacts is described within aforementioned U.S. Pat. No. 4,672,501.

Upon occurrence of an arcing fault or a ground fault, detected within the optional function plug 20 (FIG. 1), a signal output from the neutral conductor 30 is inputted over the optional signal input 37 through rectifier diode $D_6$ to the base of the programmable uni-junction transistor $Q_1$ and from the cathode of $Q_1$ to the gate of the SCR to turn on the SCR and activate the trip solenoid to separate the contacts 14 and interrupt circuit current.

The occurrence of a short time overcurrent condition is determined in the following manner. The signal occurring on the signal conductor 38 transfers through the Zener diode $Z_2$ and the voltage divider consisting of resistors $R_{10}$, $R_{11}$ and connects with the anode of diode $D_7$ and one side of the short time calibrated capacitor $C_3$ through conductor 41. When the voltage across $C_3$ exceeds the reference voltage of the programmable uni-junction transistor $Q_1$, current passes through $D_7$ to the anode of $Q_1$ to turn on the SCR and energize the trip solenoid 33 to separate the contacts 14 in the manner described earlier.

The occurrence of a long time overcurrent condition is determined in the following manner. The signal occurring on the signal conductor 38 appears at the anode of the diode $D_5$ at the junction of the voltage divider resistors $R_{12}$, $R_{13}$, to turn on the switching transistor $Q_2$ when the current exceeds a predetermined value and allow current flow from the power conductor 39 to the reverse bias diode $D_8$ at the junction of voltage divider resistors $R_{14}$–$R_{17}$ and transfer current through switching transistor $Q_2$ and provide the signal to the long time delay circuit 43. Resistor $R_{35}$ is a temperature compensation for $Q_2$ base emitter junction. The arrangement of transistors $Q_4$, $Q_5$, $Q_6$ and series resistors $R_{20}$–$R_{23}$, $R_{25}$–$R_{29}$ transistor provide logarithmic time function to the current flow to turn on transistor switch $Q_7$ when a predetermined value is exceeded. The signal appearing at the junction of the voltage divider resistors $R_{18}$, $R_{19}$ turns on transistor switch $Q_3$ to provide charging voltage to the long time capacitor $C_2$ in proportion to the logarithmic value of the current signal. When the capacitor voltage is exceeded, operating current is transferred through current limiting resistor $R_{24}$ and diode $D_9$ to the anode of the programmable uni-junction transistor $Q_1$ to turn on the trip solenoid 33 to interrupt circuit current in the manner described earlier.

To protect the circuit components thermal damage from ambient over-temperature conditions, a thermistor 40 is interconnected between the power and neutral conductor 42 in series with a resistor $R_{31}$, and connects with the SCR via diode $D_{10}$ to fire the SCR when the ambient temperature exceeds a predetermined value. The capacitor $C_4$ protects the varistor from voltage spikes that may occur between the power and neutral conductors upon occurrence of intense overcurrent conditions within the associated electric circuit.

It is believed that the small size of the Hall or GMR sensors and the use of the direct circuit connection with the electronic trip circuit for providing operating power to the trip solenoid now allows inexpensive circuit breakers having smart electronics to be used within residential and other applications where circuit breakers employing thermal magnetic trip units have heretofore been employed.

We claim:

1. A residential circuit interrupter comprising:
   a pair of separable contacts arranged for connection within an electric circuit;
   an electronic trip unit including an electric switch and a magnetic switch for separating said contacts upon occurrence of an overcurrent condition within said electric circuit;
   a Hall effect or GMR element connecting with said electronic trip unit and in magnetic proximity to an electrical conductor arranged for carrying circuit current within one phase of said electric circuit, said Hall effect or GMR element provides a current signal to said trip unit representative of said circuit current;
   a power supply circuit connecting with the electrical conductor, said power supply circuit providing operating power to said trip unit and said Hall effect or GMR element; and a conditioner circuit connecting with said Hall effect or GMR element for receiving signal output from said Hall effect or GMR element representative of said circuit current and providing signal input to said electronic trip circuit.

2. The circuit interrupter of claim 1 comprising an operational amplifier connecting between said Hall effect or GMR element and said trip unit, said operational amplifier having a pair of inputs and an output, said input signal from said Hall effect or GMR element being applied to one of said inputs and said output being connected with said trip unit.

3. The circuit interrupter of claim 2 including a feedback resistor connecting between one of said inputs and said output.

4. The circuit interrupter of claim 1 wherein said power supply circuit includes a first rectifier diode connecting between said electric circuit and said trip unit.

5. The circuit interrupter of claim 1 wherein said electric circuit comprises a multi-phase electrical circuit.

6. The circuit interrupter of claim 5 further including an additional Hall effect or GMR element, said additional Hall effect or GMR element being arranged in magnetic relation with an additional electrical conductor connecting with an additional phase of said multi-phase electric circuit.

7. The circuit interrupter of claim 2 further including a first rectifier diode, said first diode connecting between said operational amplifier and said trip unit.

8. The circuit interrupter of claim 1 including means within said circuit interrupter for electrical connection with a removable function plug, said function plug providing ground fault detection from said signal input.

9. The circuit interrupter of claim 8 including means within said circuit interrupter for electrical connection with a removable function plug, said function plug providing arcing fault detection from said signal inputs.

10. The circuit interrupter of claim 9 wherein said means for separating said contacts comprises an SCR and a trip solenoid, said SCR and said trip solenoid being electrically connected in series.

11. The circuit interrupter of claim 10 wherein said function plug connects with said SCR through a second rectifier diode for switching said SCR and a trip coil upon occurrence of a ground fault condition within said electric circuit.

12. The circuit interrupter of claim 11 wherein said function plug connects with said SCR through said second rectifier diode for switching said SCR and said trip coil upon occurrence of an arcing fault condition within said electric circuit.

13. The circuit interrupter of claim 12 wherein said trip unit includes long time overcurrent circuit means for switching said SCR and said trip coil upon occurrence of a long time overcurrent condition within said electric circuit.

14. The circuit interrupter of claim 13 wherein said trip unit includes short time overcurrent circuit means for switching said SCR and said trip coil upon occurrence of a short time overcurrent condition within said electric circuit.

15. The circuit interrupter of claim 14 wherein said long time overcurrent circuit means includes a logarithmic time function circuit.

16. The circuit interrupter of claim 15 wherein said long time overcurrent circuit means includes a first capacitor having a predetermined long time voltage value.

17. The circuit interrupter of claim 16 wherein said short time overcurrent circuit means includes a second capacitor having a predetermined short time voltage value.

18. The circuit interrupter of claim 1, wherein: said electric switch includes a junction transistor.

19. The circuit interrupter of claim 1, wherein: said electric switch includes a silicon controlled rectifier (SCR).

20. The circuit interrupter of claim 1, wherein: said magnetic switch includes a solenoid.

21. The circuit interrupter of claim 1, wherein: said magnetic switch includes a coil.

22. A circuit interrupter comprising:

a pair of separable contacts arranged for connection within an electric circuit;

an electronic trip unit including means for separating said contacts upon occurrence of an overcurrent condition within said electric circuit;

a Hall effect or GMR element connecting with said electronic trip unit and in magnetic proximity to an electrical conductor arranged for carrying circuit current within one phase of said electric circuit, said Hall effect or GMR element provides a current signal to said trip unit representative of said circuit current;

a conditioner circuit connecting with said Hall effect or GMR element for receiving signal output from said Hall effect or GMR element representative of said circuit current and providing signal input to said electronic trip circuit; and, a power supply circuit connecting with said Hall effect or GMR element and said trip unit for providing operating power to said trip unit and said Hall effect or GMR element, said power supply circuit comprising:
  a first and second rectifier diodes electrically connected to the first and second conductor in the electric circuit respectively;
  a current limiting resistor electrically connected to said first and second rectifier diodes; and,
  a voltage regulator zener diode.

23. The circuit interrupter of claim 22 comprising an operational amplifier connecting between said Hall effect or GMR element and said trip unit, said operational amplifier having a pair of inputs and an output, said input signal from said Hall effect or GMR element being applied to one of said inputs and said output being connected with said trip unit.

24. The circuit interrupter of claim 23 including a feedback resistor connecting between one of said inputs and said output.

25. The circuit interrupter of claim 24 wherein said means for separating said contacts comprises an SCR and a trip solenoid, said SCR and said trip solenoid being electrically connected in series.

26. The circuit interrupter of claim 25 wherein said trip unit includes long time overcurrent protection means for switching said SCR and said coil upon occurrence of a long time overcurrent condition within the electric circuit.

27. The circuit interrupter of claim 26 wherein said trip unit includes a short time overcurrent protection means for switching said SCR and said coil upon occurrence of a short time overcurrent condition within the electric circuit.

28. The circuit interrupter of claim 27 wherein said long time overcurrent circuit means including a logarithmic time function circuit.

29. The circuit interrupter of claim 28 wherein said long time overcurrent circuit means includes a first capacitor having a predetermined long time voltage value.

30. The circuit interrupter of claim 29 wherein said short time overcurrent circuit means includes a second capacitor having a predetermined short time voltage value.

* * * * *